US010323823B2

United States Patent
Gloss et al.

(10) Patent No.: US 10,323,823 B2
(45) Date of Patent: Jun. 18, 2019

(54) LIGHTING DEVICE, IN PARTICULAR FOG LIGHT FOR MOTOR VEHICLES

(71) Applicant: Varroc Lighting Systems, s.r.o., Senov u Noveho Jicina (CZ)

(72) Inventors: Tomas Gloss, Vitkov (CZ); Jakub Hruska, Hlucin (CZ)

(73) Assignee: VARROC LIGHTING SYSTEMS, S.R.O., Senov U Noveho (CZ)

( * ) Notice: Subject to any disclaimer, the term of this patent is extended or adjusted under 35 U.S.C. 154(b) by 0 days.

(21) Appl. No.: 16/031,370

(22) Filed: Jul. 10, 2018

(65) Prior Publication Data

US 2019/0024871 A1   Jan. 24, 2019

(30) Foreign Application Priority Data

Jul. 19, 2017   (CZ) .................................... 2017-419

(51) Int. Cl.
| | |
|---|---|
| *F21V 5/04* | (2006.01) |
| *F21S 41/275* | (2018.01) |
| *F21S 41/255* | (2018.01) |
| *B60Q 1/20* | (2006.01) |
| *F21S 43/20* | (2018.01) |
| *F21W 102/30* | (2018.01) |
| *F21W 103/40* | (2018.01) |

(52) U.S. Cl.
CPC ................ *F21V 5/045* (2013.01); *B60Q 1/20* (2013.01); *F21S 41/255* (2018.01); *F21S 41/275* (2018.01); *F21S 43/26* (2018.01); *F21W 2102/30* (2018.01); *F21W 2103/40* (2018.01)

(58) Field of Classification Search
CPC ....... F21S 41/255; F21S 41/275; F21V 5/045; B60Q 1/20
See application file for complete search history.

(56) References Cited

U.S. PATENT DOCUMENTS

| | | | | |
|---|---|---|---|---|
| 2,454,332 A | * | 11/1948 | Mitchell | ................... F21V 5/04 362/337 |
| 2007/0002571 A1 | | 1/2007 | Cejnek et al. | |
| 2012/0033441 A1 | | 2/2012 | Sousek et al. | |
| 2012/0075866 A1 | | 3/2012 | Chang | |
| 2014/0321113 A1 | * | 10/2014 | Onac | ......................... F21V 9/30 362/231 |

(Continued)

FOREIGN PATENT DOCUMENTS

| | | |
|---|---|---|
| CZ | 296081 B6 | 1/2006 |
| CZ | 302547 B6 | 7/2011 |

(Continued)

OTHER PUBLICATIONS

Search Report from Corresponding Czech Application No. PV 2017-419 dated Apr. 17, 2018.

*Primary Examiner* — Kevin Quarterman
(74) *Attorney, Agent, or Firm* — Hovey Williams LLP (57) ABSTRACT

The lighting device, in particular the fog light for motor vehicles comprises a lighting unit for emitting light beams and a lens on which the light beams fall, configured as a Fresnel lens to form light paths in the plane (zy), which is perpendicular to the axis (x) passing through the center of the lens and located at a distance in front of the lens. The lens is not axially symmetrical with respect to the axis (x) and its zones are configured to form a light path whose height (v) is smaller than its width (s).

13 Claims, 11 Drawing Sheets

(56) References Cited

U.S. PATENT DOCUMENTS

| | | | |
|---|---|---|---|
| 2015/0070901 A1* | 3/2015 | Rich | F21V 5/02 362/311.01 |
| 2016/0025299 A1* | 1/2016 | Yamazaki | F21V 5/00 362/336 |
| 2016/0356457 A1* | 12/2016 | Wang | F21V 5/02 |
| 2016/0363288 A1* | 12/2016 | McKendry | B60Q 1/2696 |

FOREIGN PATENT DOCUMENTS

| | | |
|---|---|---|
| CZ | 20100602 A3 | 2/2012 |
| EP | 0322370 A1 | 6/1989 |
| EP | 1039214 A2 | 9/2000 |
| EP | 2351963 A1 | 8/2011 |
| GB | 2041189 A | 9/1980 |
| JP | 2008181717 A | 8/2008 |

\* cited by examiner

LIGHTING DEVICE, IN PARTICULAR FOG LIGHT FOR MOTOR VEHICLES

RELATED APPLICATIONS

This application claims the priority benefit of Czech Patent Application Serial No. PV 2017-419 entitled "A LIGHTING DEVICE, IN PARTICULAR FOG LIGHT FOR MOTOR VEHICLES," filed Jul. 19, 2017, the entire disclosure of which is incorporated herein by reference.

FIELD OF THE INVENTION

The invention relates to a lighting device, in particular a fog light for motor vehicles. The invention encompasses an area of arrangements, in particular, a signal lamp adapted to provide the desired radiation pattern of the light path for lighting under reduced visibility.

PRIOR ART

At present, motor vehicles, with the exception of headlamps and tail lamps, are equipped with signal lights designed to emit beams of light rays under reduced visibility, for example in the case of fog or heavy rain. Such signal lights may be incorporated into the bodywork as separate illuminating bodies or may be an integral part of the headlamps and tail lamps in the form of a sub-lighting unit. Lighting units for front fog lights provide short but wide white light rays that help to glow through fog, heavy rain or snow, and illuminate the area just in front of the vehicle.

The rear red fog light enhances road safety by helping to improve the visibility of the vehicle for other road users. For example, CZ302547 reference discloses an adaptive front-lighting system for motor vehicles where the passing fog light is made by integrating the main passing light of the main headlamps together with both side lights of the static side light units.

The optical elements of signalling or lighting devices are a set of refraction and reflection surfaces and interfaces of optical environments that affect the direction of light rays when creating an output light path. One of the used optical elements is a Fresnel lens. This lens is characterized by the fact that it has a substantially lower weight than a conventional lens at similar parameters and the same material used, because it removes those parts which are not directly involved in the refraction of the light rays. Due to its smaller thickness, a Fresnel lens is suitable for application in lighting and signalling technology in cases where the installation space for the optical assembly is limited. For example, CZ20100602 reference discloses a light-conducting module comprising a Fresnel type toroid lens. CZ296081 reference describes a LED light comprising a refractor consisting of Fresnel lenses and scattering pads. The disadvantage of using a Fresnel lens is the fact that it is adapted to create conical beams of light rays, whereas the regulation for the rear fog light prescribing luminous intensity in the area, which has, in angular coordinates, the shape of a diamond with a double width in the horizontal direction than in the vertical direction. Thus, in order to illuminate this rotationally unsymmetrical area, the use of a conventional rotationally symmetrical Fresnel lens is not advantageous.

EP322370 reference informs about the embodiment of a rear fog light comprising a transparent element having an inner surface formed by a rectangular field of optical prisms comprising a central zone and a great number of peripheral zones, each zone having a set of refraction surfaces for directing light rays to a particular area of the emitted light pattern. The disadvantage of this arrangement is a large number of edges of optical prisms. In production, these idealized edges are replaced with a rounding that reduces the optical efficiency of the system. Also, producing a tool for such a part with a large number of optical elements is more demanding than producing a Fresnel lens with a relatively low number of optical zones.

GB2041189B reference describes a lighting device for a rear fog light and a brake light, which is a central Fresnel system of refraction surfaces and elongated lenses oriented in the vertical direction. The disadvantage of this solution is that it is not possible to achieve the distribution of luminous intensity in the shape of a diamond, where part of the light necessarily escapes out of the diamond and therefore, it is not effectively used. Another disadvantage of this solution is the presence of optical elements on both sides of the transparent part, which results in higher costs of manufacturing of the tool for such a part.

The aim of the present invention is to design a lighting device, which has low requirements for installation in the body of a vehicle, its solution provides high efficiency of the optical system, and allows to form a luminous pattern of approximately diamond shape by means of a surface-shaped lens on the display surface. The aim also is that the solution according to the invention could be used for a rear indicator lamp for motor vehicles adapted to provide a light beam for lighting under reduced visibility.

SUMMARY OF THE INVENTION

The above-mentioned aims of the present invention are met by a lighting device, in particular a fog light for motor vehicles, comprising a light ray transmitting unit, a lens on which light rays fall, configured as a Fresnel lens to produce a light path in zy plane that is perpendicular to x axis passing through the centre of the lens and is located at a distance in front of the lens. The lens is not axially symmetrical with respect to x axis, and its zones are configured to produce a light path whose height is less than its width.

According to one of the embodiments, the lens is planar.

According to one of the embodiments, the lens is symmetrical with respect to xy horizontal plane.

According to one of the embodiments, the lens is symmetrical with respect to zx vertical plane.

According to one of the embodiments, the lens comprises zones arranged as rings around the centre of the lens, where each ring farther from the centre of the lens surrounds the rings closer to the centre of the lens, wherein from each pair of adjacent zones a zone farther away from the centre of the lens in zx vertical plane deflects a beam of light rays from the direction of the axis at the vertical angle greater than or equal to the vertical angle at which the other zone of the pair of the zones deflects a beam of light rays from the said x axis direction in this zx plane.

According to one of the embodiments, the lens comprises rings arranged around the centre of the lens, where each ring farther from the centre of the lens surrounding the rings closer to the centre of the lens, whereas from each pair of adjacent zones a zone farther away from the centre of the lens in xy horizontal plane deflects a beam of light rays from the direction of x axis at the horizontal angle greater than or equal to the horizontal angle at which the other zone of the pair of the zones deflects a beam of light rays from the said axis direction.

In an embodiment, for each zone it is true that it deflects a beam of light rays by the horizontal angle greater than the vertical angle by which it deflects a beam of light rays.

The horizontal angle can be twice the vertical angle.

The horizontal angle by which the zone, which is the farthest from the centre of the lens, deflects a beam of light rays, can be less than or equal to 20°.

According to one of the embodiments, the height of the light path is approximately half its width.

In one of the embodiments, the lens can have a central part for directing a beam of light rays in x axis direction.

According to one of the embodiments, in the projection of the lens plane, each of the lens zones is defined by a ring, whose edges are formed by closed curves, which, in this projection, in each of the four parts of the lens, are composed of the first arc with the following first radius, the second arc with the second radius and the third arc with the third radius, the first radius being equal to the third radius, and the second radius being twice the first radius. For each zone, the first radius of the zone can be equal to two thirds of the distance of the edge of the zone from the centre of the lens, measured in xy horizontal plane.

The presented solution achieves a new and higher effect by means of one transparent part containing an assembly of Fresnel zones, by which the direction of light is allowed so as to achieve a horizontal and vertical asymmetry of dispersion. The optical assembly has a high efficiency and thanks to this, the photometric specifications for the rear fog light can be met using only one light source. The transparent part, together with the light source, can be assembled into a cube-shaped space with a minimum edge length of up to 10 mm, which makes it possible to greatly save the interior space of the vehicle body or the interior of the group signal light.

BRIEF DESCRIPTION OF THE DRAWINGS

The invention will be further clarified by means of examples with reference to the accompanying drawings, in which it is shown.

EXAMPLES OF INVENTION EMBODIMENTS

For the purposes of this application, x, y, z axes are axes of the rectangular coordinate system, whereas x axis passes through the centre 18 of the lens 6 and lies in the optical axis. The lens 6 can be planar or non-planar (for example, slightly dish-shaped), and the plane in which it is approximately located is perpendicular to x axis and parallel to zy plane, into which the light path 12 is projected. X and y axes are referred to as "horizontal" and z axis as "vertical" so that xy plane is referred to as "horizontal" and zy and zx planes as "vertical", although this designation does not necessarily mean that the lens 6 is located in the vertical plane in the geographical sense.

Figure 1:
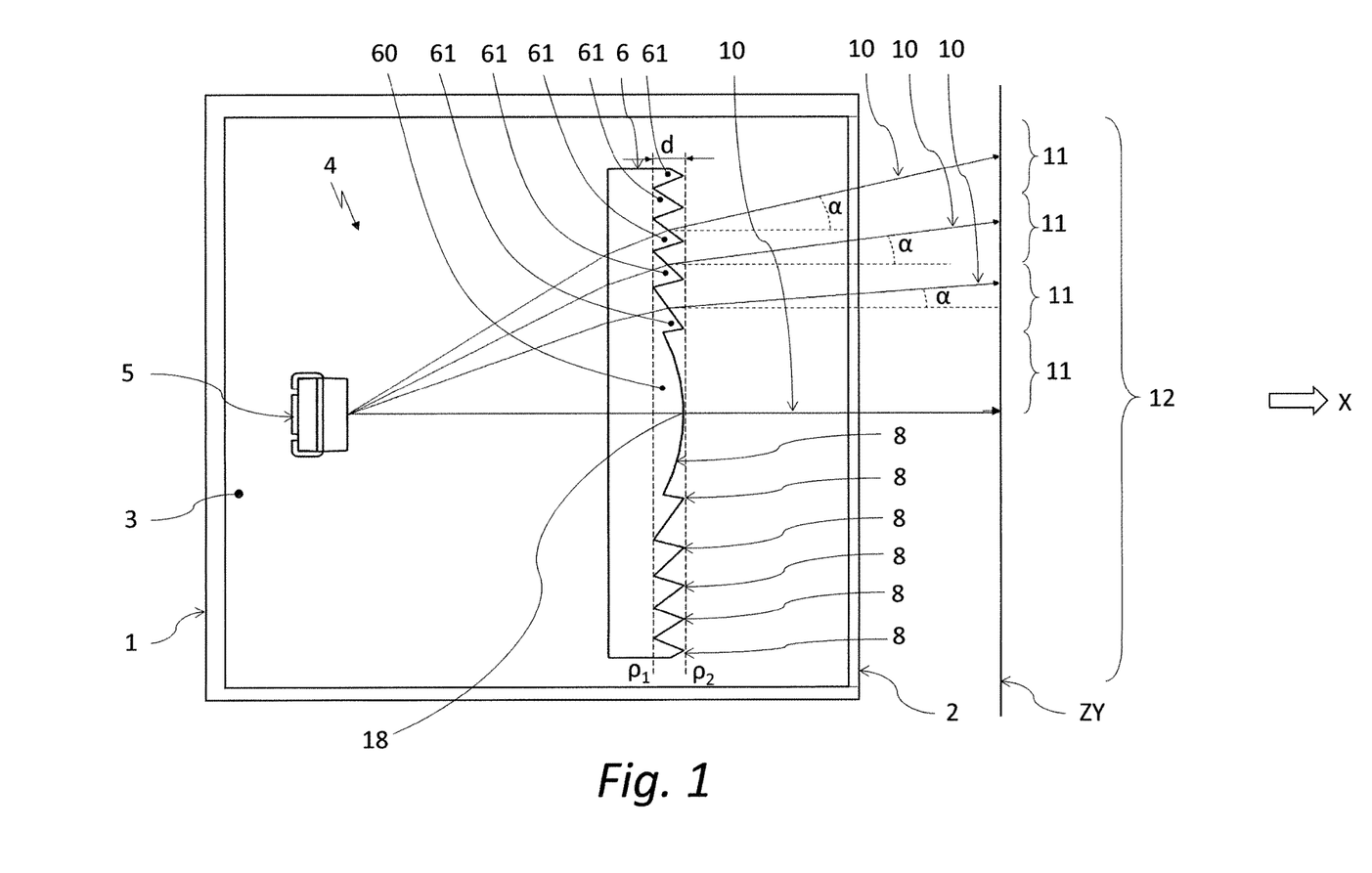
FIG. 1—Longitudinal sectional view of an embodiment of the lighting device according to the invention.

FIG. 1 illustrates a motor vehicle lighting device according to the invention comprising a supporting housing 1 covered by a translucent cover 2 and an inner chamber 3, in which an optical system 4 is provided to form light paths 12 by means of radiated light rays 10. The optical system 4 comprises an illumination unit 5 for emitting the light rays 10 and a compact transparent lens 6 configured as a Fresnel lens and comprising optical elements 8 for directing/deflecting the light rays 10 into the sub-areas 11 of the light path 12.

Optical elements 8 are located in zones 61. The number of zones 61 may vary in the individual embodiments of the invention, with the lens 6 having at least two zones 61. The lens 6 can also include a central part 60, which directs beams of light rays 10 in the direction of x axis. The individual zones 61 are arranged in the rings surrounding the centre 18 of the lens 6 located on x axis, whereas the zone 61 farther from the centre 18 surrounds the zones 61, which are located closer to the centre 18.

For each zone 61 there is a vertical angle α, which denotes an angle between x axis and the direction, in which there is the greatest luminous intensity in zx plane from a beam of light rays 10 deflected by this zone 61. Whereas it is true that from each pair of the adjacent zones 61, the zone 61 farther from the centre 18 of the lens 6 deflects a beam of light rays 10 by the vertical angle α greater than or equal to the vertical angle α by which the zone 61, which is closer to the centre 18 from this pair, deflects a beam of light rays 10.

Figure 2:
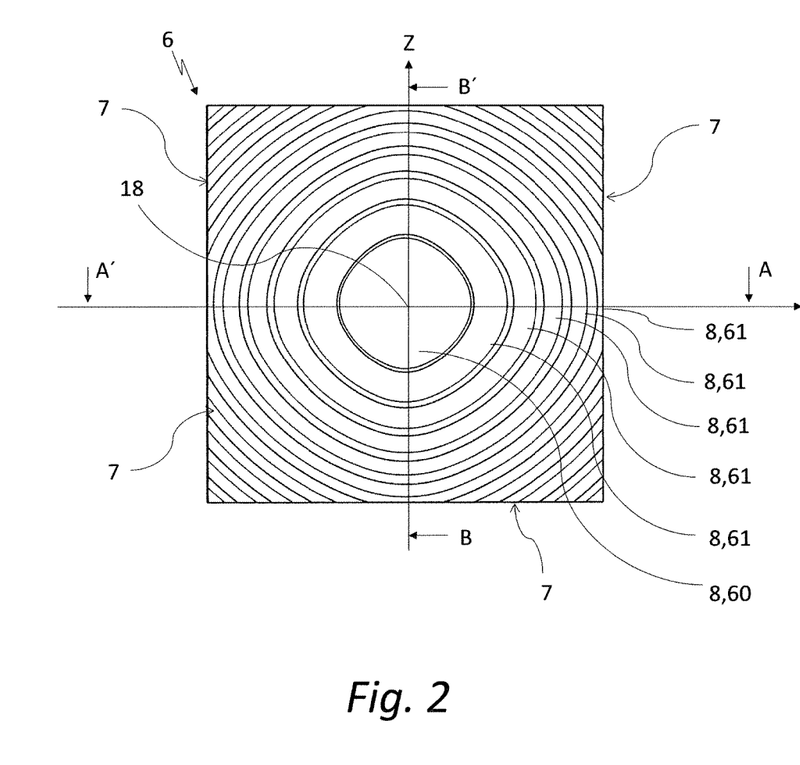
FIG. 2—Front view of an exemplary embodiment of the lens of the lighting device according to the invention.
Figure 3:
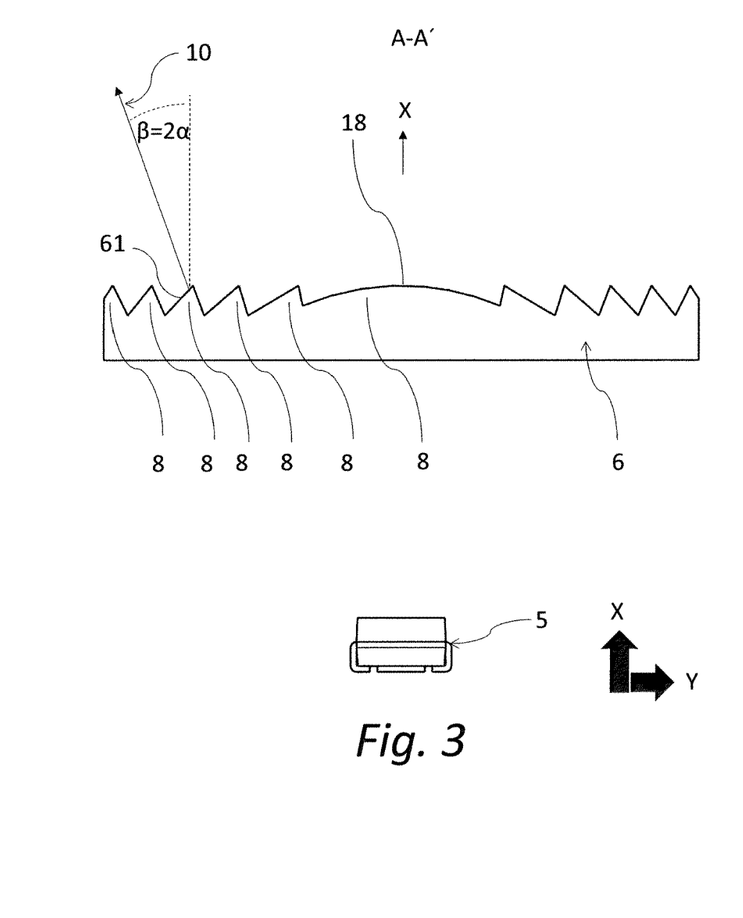
FIG. 3—Longitudinal horizontal sectional view through line A-A" through the lens of FIG. 2.
Figure 4:
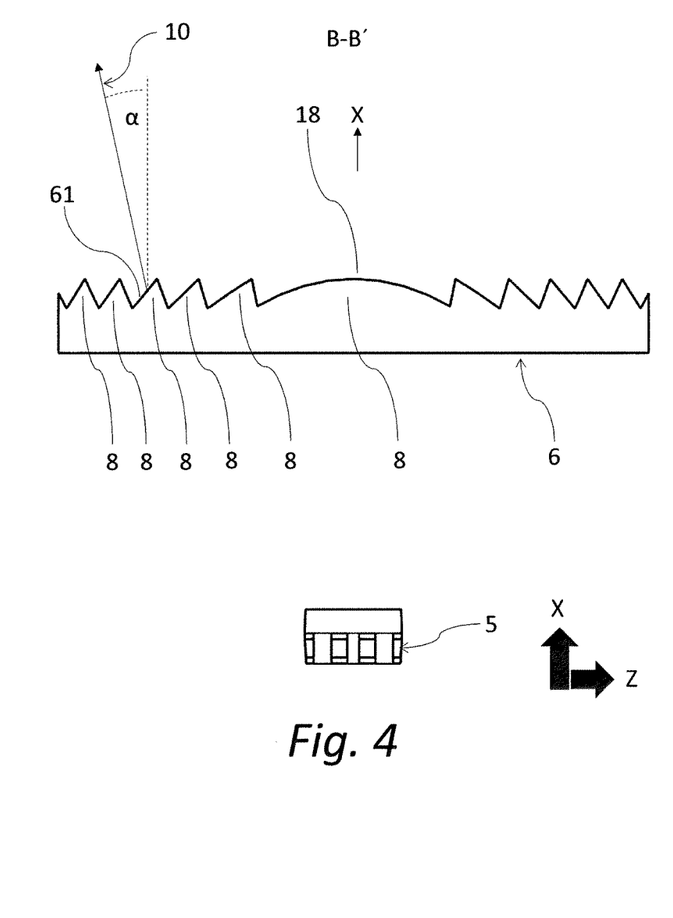
FIG. 4—Longitudinal vertical sectional view through line B-B" through the lens of FIG. 2.

As shown in FIGS. 2, 3 and 4, next to the angle α, the horizontal angle β is also provided for each zone 61, which is the angle between x axis and the direction in which in xy plane there is the greatest luminous intensity from beam of light rays 10 deflected by this zone 61. Whereas it is true that from each pair of adjacent zones 61, the zone 61 farther from the centre 18 of the lens 6 deflects beam of light rays 10 by the horizontal angle β greater than or equal to the horizontal angle β, by which the zone 61, which is closer to the centre 18 from this pair, deflects beam of light rays 10.

In the advantageous embodiment depicted in FIGS. 3 and 4, the horizontal angle β for each zone 61 is twice the vertical angle α. In other embodiments, the ratio of the angles α and β of the zones 61 may be different, and this ratio may also vary for the individual zones 61.

As noted, the central part 60 is adapted to form a beam of light rays 10 whose maximum luminous intensity is in the direction of x optical axis, or the horizontal angle α and the vertical angle β for the central part 60 is zero.

The zones 61 are, in the embodiment shown in FIG. 1, in the lens 6 located in such a way that they have one edge on pi plane and the other on $\rho_2$ plane, the $\rho_1$ and $\rho_2$ planes being parallel to one another and apart by the distance d. The lens shown in FIG. 1 is planar. However, there may also be embodiments in which the lens 6 may have a non-planar shape, for example, being slightly convex or concave.

In the case of the embodiment used to make the rear fog light with respect to the required photometry, the vertical angle α, by which the zone 61, which is the farthest from the centre, deflects a beam of light rays 10 with the maximum luminous intensity, i.e. the maximum vertical angle α, by which a beam of light rays 10 is deflected by the lens 6, is less than or equal to 10°. In other embodiments, the maximum vertical angle α may be different.

Figure 5:
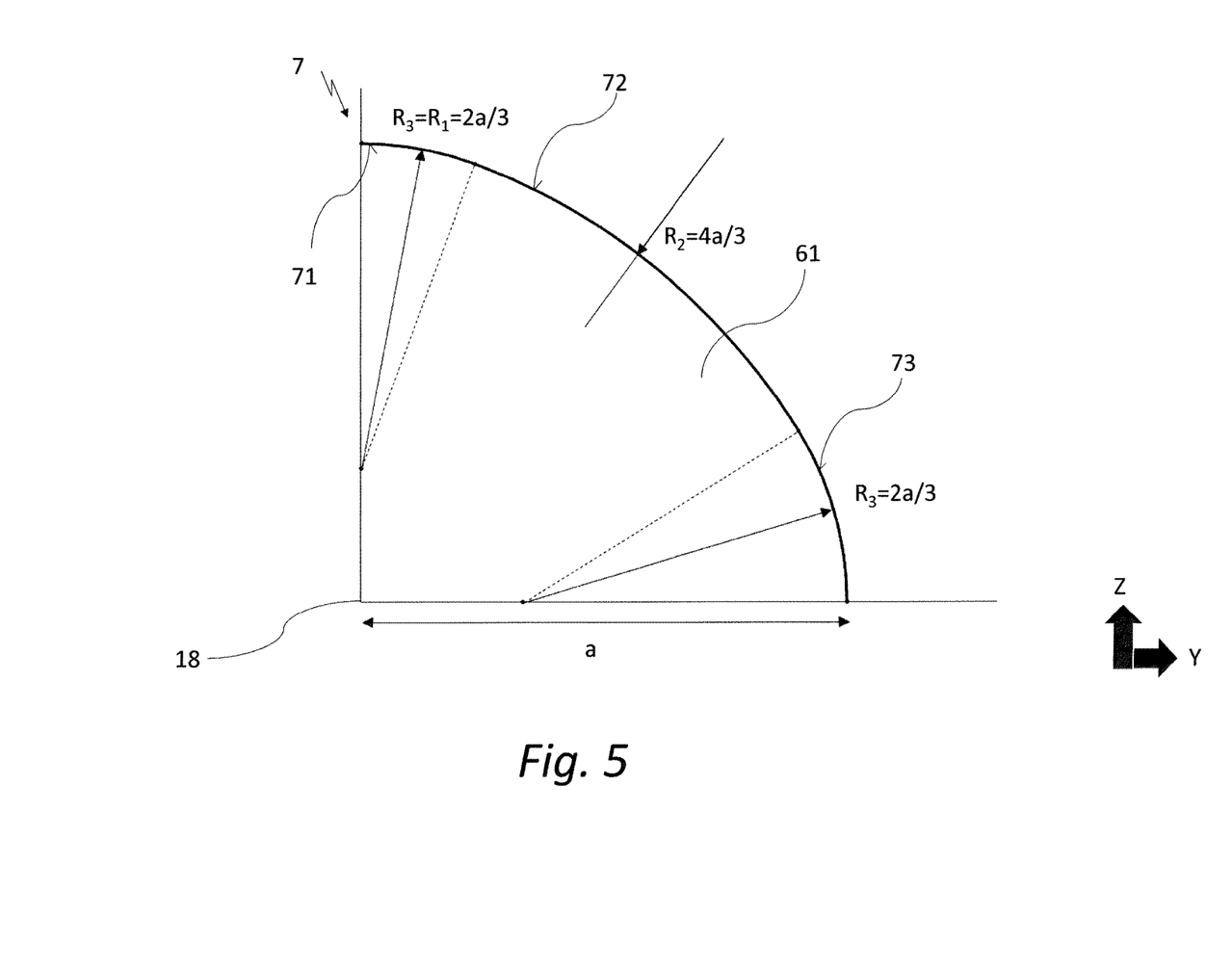
FIG. 5—Example of a curve shape defining a zone of a lens of a lighting device according to the invention in one of the quadrants.

FIG. 2 shows the projection of the lens 6 to zy plane. As can be seen, the lens 6 is in this embodiment symmetrical with respect to xy plane and it is also symmetrical with respect to zx vertical plane. The face of the lens 6 is composed of four mutually identical parts 7. Each of the zones 61 of the lens 6 is defined by a ring. The edges of this ring are formed by closed curves, which, as shown in FIG. 5 depicting one of the possible embodiments, consist in each of the four parts 7 of the lens 6 of three successive circular arcs 71, 72, 73, of which the first arc 71 has the first radius R1, the second arc 72 has the second radius R2, and third arc 73 has the third radius R3. In one embodiment, the first radius R1 is equal to the third radius R3 and the second radius R2 is twice the first radius R1, whereas the first radius R1 can be equal to two thirds of the distance a of the edge of the zone 61 in xy plane from the centre 18 of the lens 6.

Figure 6:
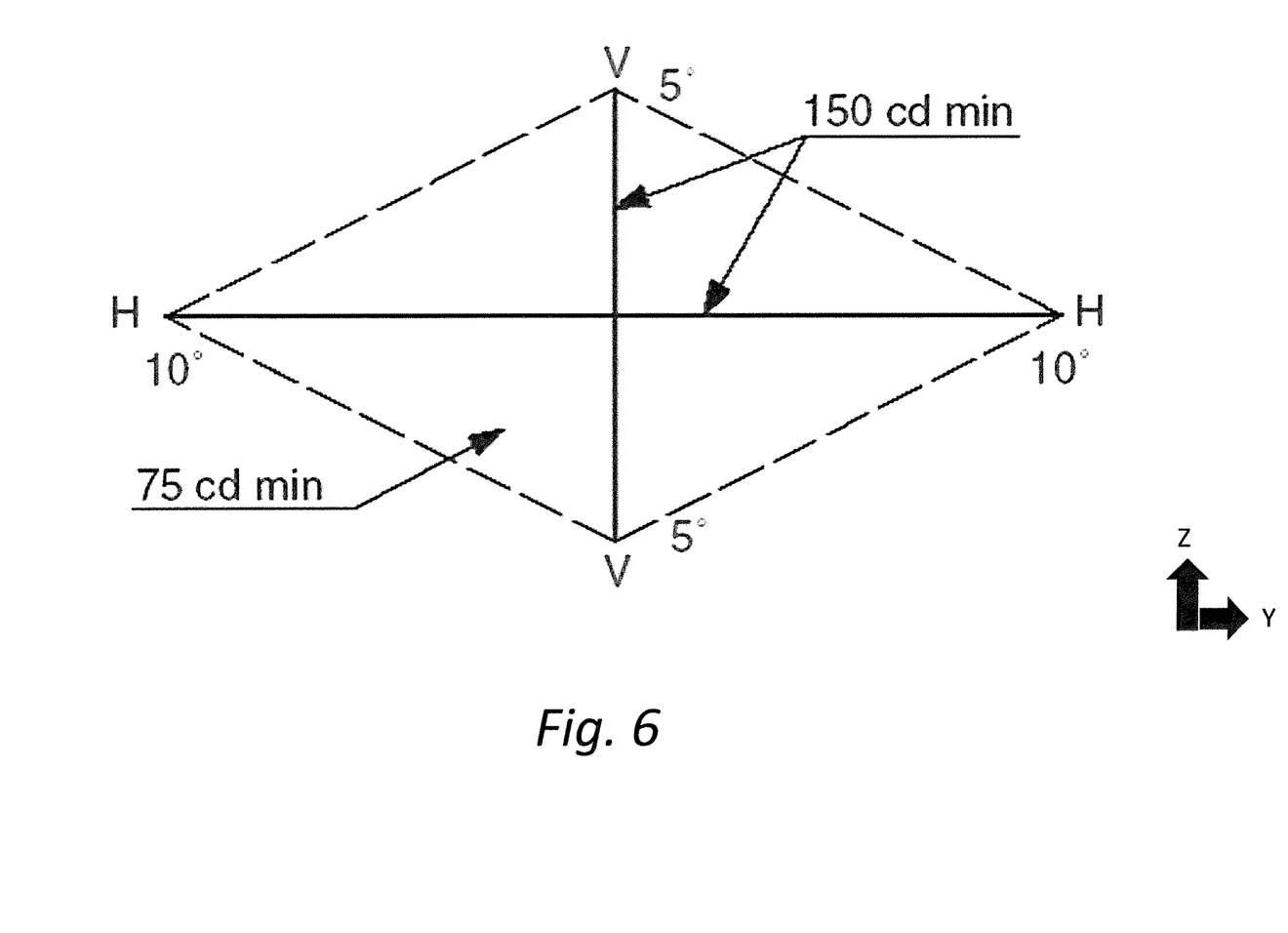
FIG. 6—Shape and luminous intensity prescribed by the relevant regulations for the light path of the fog light.

The relevant requirements set out to meet the required fog light characteristics are shown in FIG. 6. In the horizontal direction the rear fog light must have a minimum luminous intensity of 150 cd in the range of −10° to 10°, and in the vertical direction in the range of −5° to 5°, thus the area with a minimum luminous intensity of 150 cd has the shape of a cross. In the diamond area drawn around this cross, a minimum luminous intensity of 75 cd must be met outside this cross.

FIGS. 7 to 13 show the angular distribution of luminous intensity of the light beams 15. As can be seen from FIG. 7, the light beams 15 emerging from the central part 60 of the lens 6 in each part 7 of the lens 6 are adapted to form one sub-area 11 of the light path 12, comprising the area 16 with a higher luminous intensity around x optical axis and the area 17 with a lower luminous intensity located around the area 16 with a higher luminous intensity, whereas the areas 16, 17 are approximately elliptical. The area 16 with a higher luminous intensity is such a place of the light path 12 where a value of at least 50% of the maximum luminous intensity is reached. The area 17 of lower luminous intensity represents the light path 12, where the value from 25% to 50% of the maximum luminous intensity is reached.

Figures 7, 8:
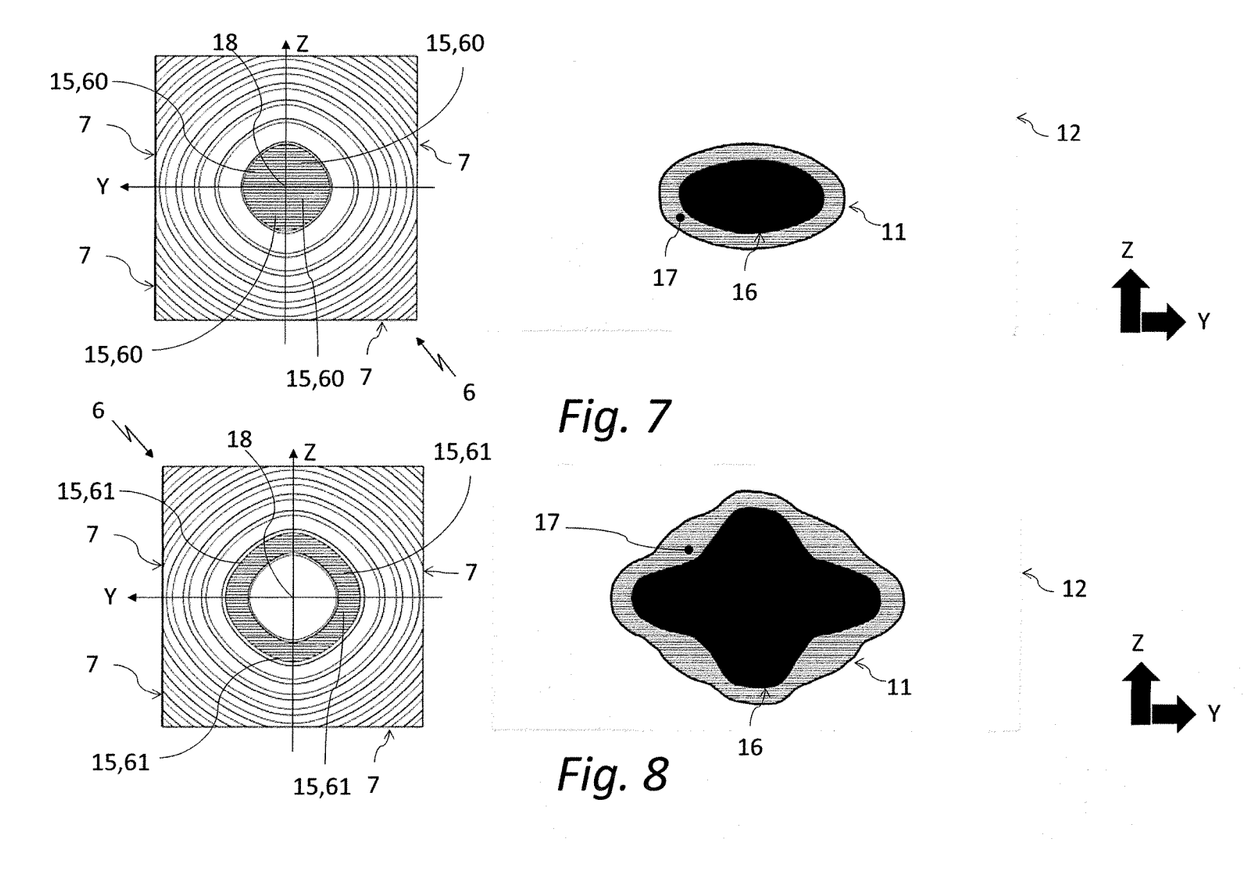
FIGS. 7 to 12—Partial angular distribution of luminous intensity of the light beams coming out from individual zones of the exemplary embodiment of the lens of the lighting device according to the invention.

As can be seen from FIG. 8, the light beams 15 coming out from the zone 61 of the lens 6 closest to the central part 60 are adapted to form one sub-area 11 of the light path 12 where the high luminous area 16 is centred around x optical axis and approximately cross-shaped, while the lower luminous area 17 is approximately diamond-shaped.

Figure 9:
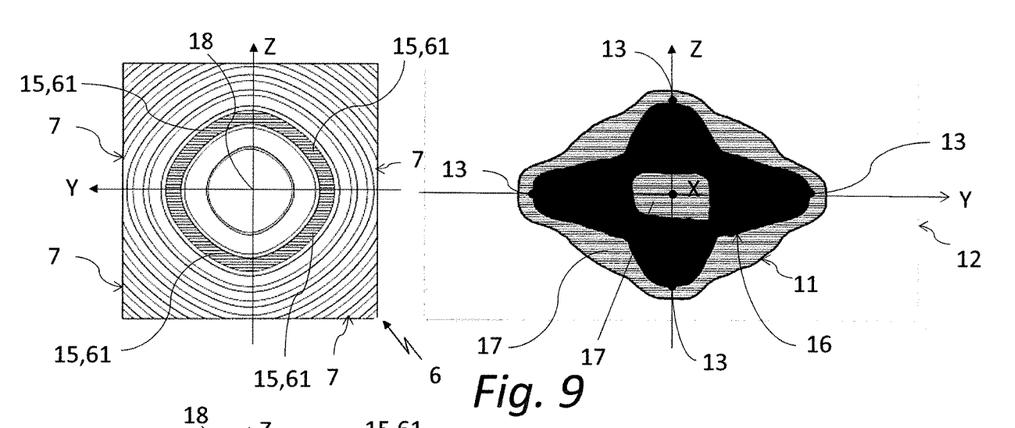

As shown in FIG. 9, the light beams 15 coming out from the following zone 61 of the lens 6 are adapted to form one sub-area 11 of the light path 12. The higher luminous intensity area 16 is no longer located in the immediate vicinity of x optical axis, where the lower luminous intensity area 17 is located. The extreme points 13 of the higher luminous intensity area 16 are located in the horizontal direction of y axis and can be at a double distance from x optical axis than in the vertical direction z. The lower luminous area 17 whose outer contour has a shape similar to a diamond is located around the higher luminous intensity area 16.

Figure 10:
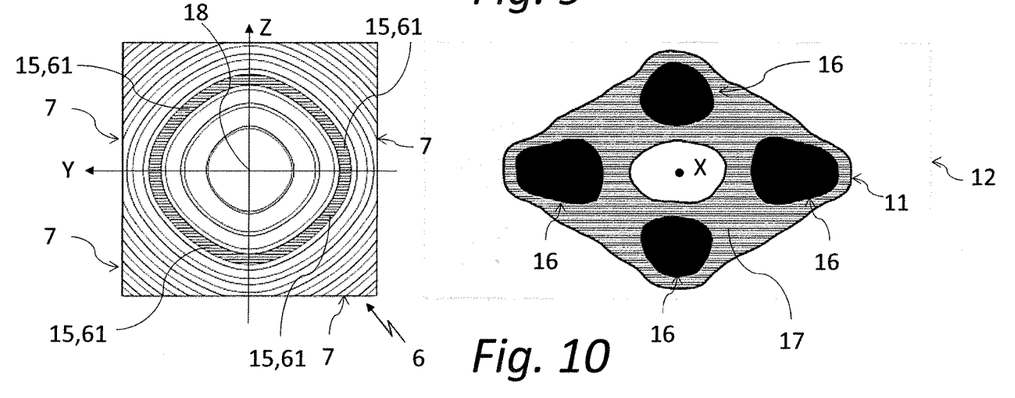
Figure 11:
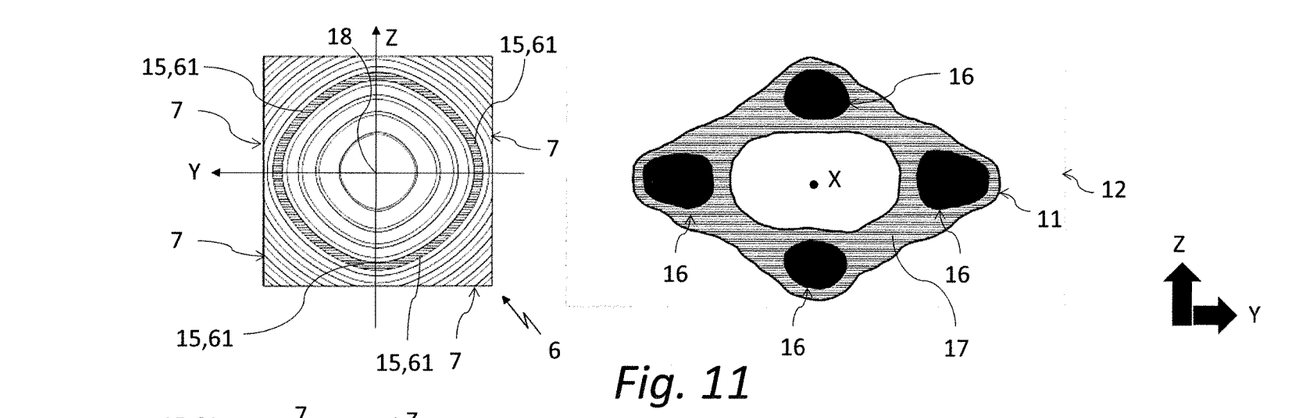

As shown in FIGS. 10 and 11, the following two zones 61 of the lens 6 form four areas 16 with a higher luminous intensity of one sub-area 11 of the light path 12, which move further away from x optical axis in comparison with the sub-areas 11 of the light path 12 formed by the preceding zones 61.

Figure 12:
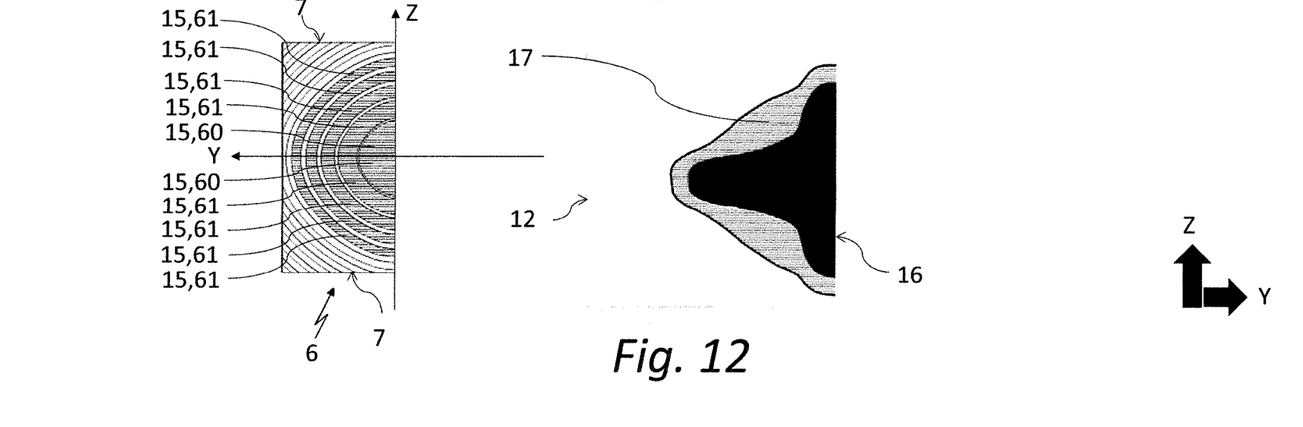

FIG. 12 shows a partial sum of the luminous intensities of the light beams 15 coming out from the two parts 7 of the lens 6 and formed by the central part 60 and the four zones 61 of the lens 6 closest to the central part 60. The individual sub-areas 11 formed by the central part 60 and the four subsequent zones 61 of two of the parts 7 of the lens 6 partially overlap each other so that the resulting luminous distribution is smooth. The two parts 7 shown in the lens 6 then form a compound area 16 with a higher luminous intensity in the form of a light pattern approximately in the shape of a half of a cross and a compound area 17 with a lower luminous intensity approximately in the shape of half of a diamond.

Figure 13:
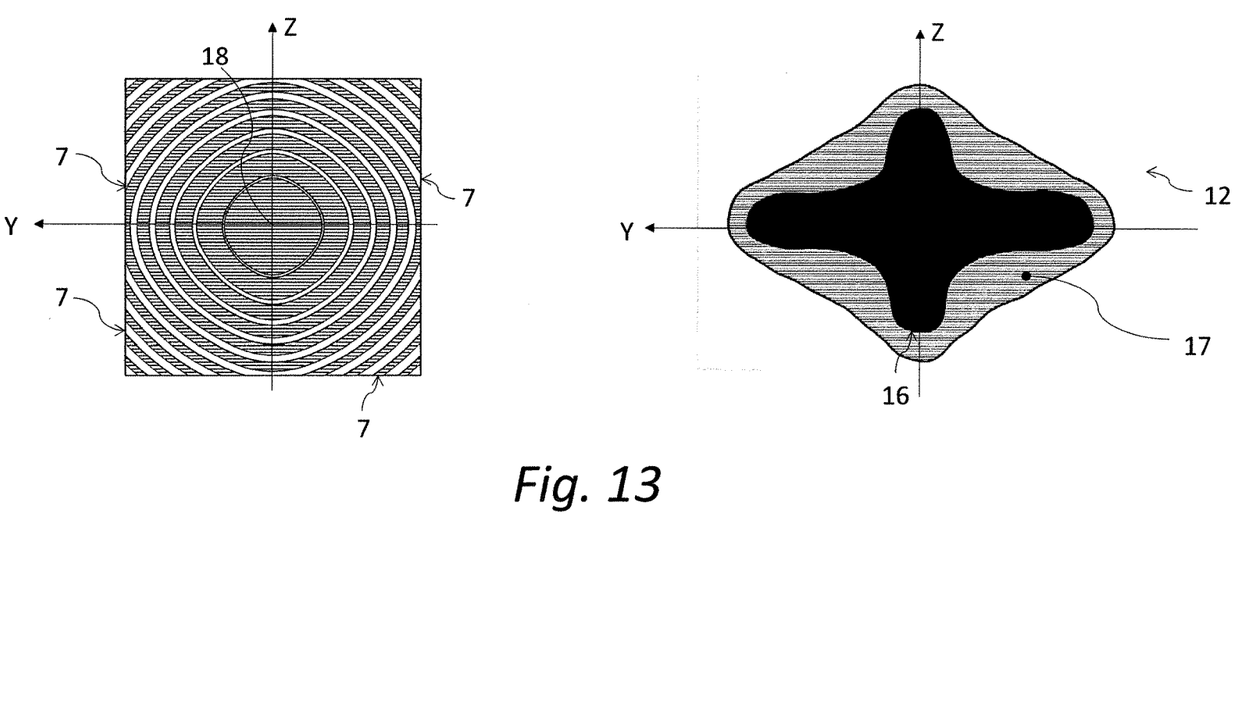
FIG. 13—Overall angular distribution of luminous intensity of the light beams coming out from all the highlighted zones of the exemplary embodiment of the lens of the lighting device of the invention.

FIG. 13 shows the angular distribution of luminous intensity of all light beams 15 coming out from all four parts 7 of the lens 6. The sub-areas 11 of the light path 12 formed by the central part 60 and all the zones 61 partially overlap one another so that the higher luminous intensity area 16 produces a light cross-shaped pattern and the lower luminous intensity area 17 has a diamond shape, thereby meeting the prescribed standard for the rear fog light shown in FIG. 6, without unnecessary waste of light.

Figure 14:
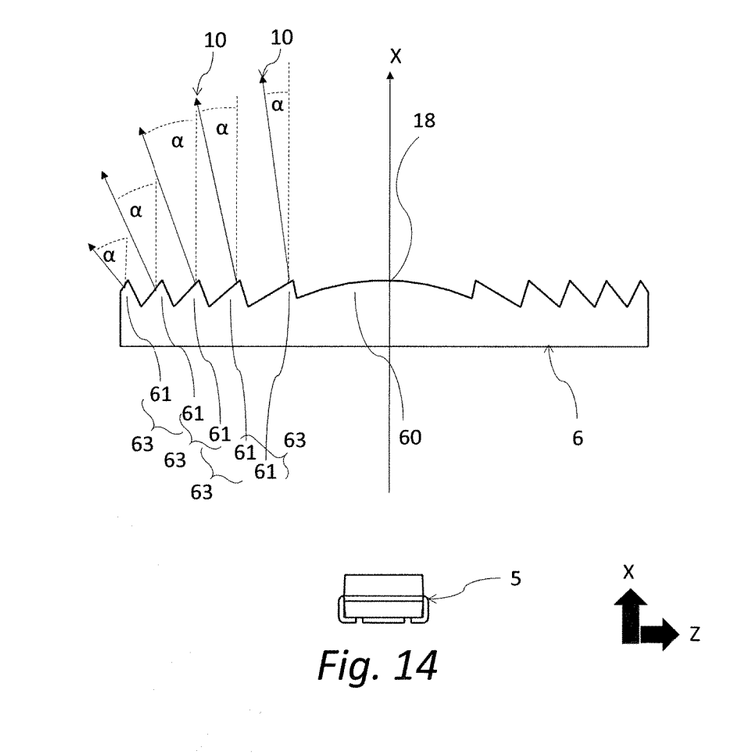
FIG. 14—Another example of the lens embodiment according to the invention.

FIG. 14 shows an example of the invention which includes the lens 6 for whose zones 61 it is true that in each pair 63 of the adjacent zones 61, the zone 61 farther from x axis deflects a beam of light rays 10 in zx plane by the vertical angle α that is greater than the vertical angle α, by which a beam of light rays 10 is deflects by the zone 61 which is closer to x axis from this pair 63.

Figure 15:
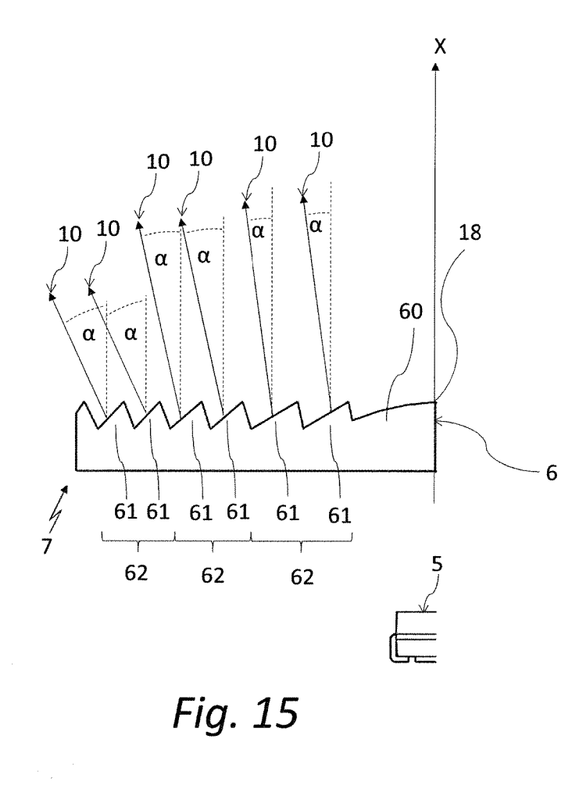
FIG. 15—One more example of the lens embodiment according to the invention.

FIG. 15 shows another embodiment of the invention utilizing the lens 6 comprising consecutive adjacent pairs 62 of the adjacent zones 61 where in each pair 62 both zones 61 exhibit the same vertical angle α of deflection, whereas it is also true that the pair 62 that is more distant from the central part 60 contains the zones 61 with a greater vertical angle α of deflection than the adjacent pair 62, which is closer to the central part 60.

In one embodiment, the height v of the light path (12) is approximately half of the width s of the light path.

LIST OF RELATED SIGNS

1—housing
2—cover
3—chamber
4—optical system
5—lighting unit
6—lens
7—part of the lens
8—optical element
10—light ray
11—sub-area
12—light footprint
13—extreme point
15—beam of light rays
16, 17—area
18—centre of the lens
60—central part
61—zone
62—adjacent pairs of adjacent zones
63—pair of adjacent zones
71—the first arc
72—the second arc
73—the third arc R1—first radius
R2—second radius
R3—third radius
a, d—distance
α—vertical angle
β—horizontal angle
ρ1, ρ2—plane
v—the height of the light path
V—vertical
H—horizontal
s—width of the light path
x, y, z—axes of the rectangular coordinate system
xy, zx, zy—plane

The invention claimed is:

1. A lighting device for motor vehicles comprising a lighting unit for emitting light rays, a lens on which the light rays fall, configured as a Fresnel lens, to produce a light footprint in an imaging plane (zy), which the imaging plane (zy) is perpendicular to an optical axis (x) passing through the centre of the lens and located at a distance in front of the lens, wherein the lens is not axially symmetrical to the optical axis (x) and comprises zones that are configured to deflect beams of light rays that pass through the lens in a direction from the optical axis (x) so as to form a light footprint from the lens whose height (v) is smaller than its width(s).

2. A lighting device according to claim 1, wherein the lens is planar.

3. A lighting device according to claim 1, wherein the lens is symmetrical with respect to a horizontal plane (xy) including the optical axis (x).

4. A lighting device according to claim 1, wherein the lens is symmetrical with respect to a vertical plane (zx) including the optical axis (x).

5. A lighting device according to claim 1, wherein the zones of the lens are arranged as rings around a centre of the lens, where each ring farther from the centre of the lens surrounds the rings closer to the centre of the lens, wherein from each pair of the adjacent zones the zone farther away from the centre of the lens is configured to deflect, in a vertical plane (zx), a beam of light rays from a direction of the optical axis (x) at a vertical angle (α) that is greater than or equal to the vertical angle (α) at which, in the vertical plane (zx), the other zone from the pair of the zones is configured to deflect a beam of light rays from the direction of the optical axis (x).

6. A lighting device according to claim 1, wherein the zones of the lens are arranged as rings around a centre of the lens, where each ring farther from the centre of the lens surrounds the rings closer to the centre of the lens, wherein from each pair of the adjacent zones the zone farther away from the centre of the lens is configured to deflect, in a horizontal plane (xy), a beam of light rays from a direction of the optical axis (x) at a horizontal angle (β) which is greater than or equal to a horizontal angle (β) at which, in the horizontal plane (xy), the other zone from the pair of the zones deflects a beam of light rays from the direction of the optical axis (x).

7. A lighting device according to claim 5, wherein each zone is configured to deflect a beam of light rays by a horizontal angle (β) that is greater than a vertical angle (α) by which the zone is configured to deflect a beam of light rays.

8. A lighting device according to claim 7, wherein the horizontal angle (β) is twice the vertical angle (α).

9. A lighting device according to claim 6, wherein the horizontal angle (β) by which the zone that is the most distant of zones from the centre of the lens deflects a beam of light rays is less than or equal to 20°.

10. A lighting device according to claim 1, wherein the height (v) of the light footprint is approximately half its width(s).

11. A lighting device according to claim 1, wherein the lens comprises a central part for directing a beam of light rays in the direction of the optical axis (x).

12. A lighting device according to claim 1, wherein in a projection into a surface of the lens, each of the zones of the lens is delimited by a ring whose edges are formed by closed curves which are in this projection in each of four parts of the lens made from a first adjacent arc with a first radius (R1), a second arc with a second radius (R2) and a third arc with a third radius (R3), wherein the first radius (R1) is equal to the third radius (R3), and the second radius (R2) is twice the first radius (R1).

13. A lighting device according to claim 12, wherein for each zone, the first radius (R1) of the zone is equal to two thirds of a distance (a), measured in a horizontal plane (xy), of an edge of the zone from the centre of the lens.

* * * * *